(12) United States Patent
Nainar et al.

(10) Patent No.: US 10,320,664 B2
(45) Date of Patent: Jun. 11, 2019

(54) CLOUD OVERLAY FOR OPERATIONS ADMINISTRATION AND MANAGEMENT

(71) Applicant: Cisco Technology, Inc., San Jose, CA (US)

(72) Inventors: Nagendra Kumar Nainar, San Jose, CA (US); Carlos M. Pignataro, Raleigh, NC (US); Deepak Kumar, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 101 days.

(21) Appl. No.: 15/216,334

(22) Filed: Jul. 21, 2016

(65) Prior Publication Data

US 2018/0026884 A1 Jan. 25, 2018

(51) Int. Cl.
| | |
|---|---|
| H04L 12/723 | (2013.01) |
| H04L 12/46 | (2006.01) |
| H04L 12/715 | (2013.01) |
| H04L 12/24 | (2006.01) |
| H04L 29/08 | (2006.01) |

(52) U.S. Cl.
CPC .............. *H04L 45/50* (2013.01); *H04L 41/00* (2013.01); *H04L 45/64* (2013.01); *H04L 12/4633* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 3,629,512 | A | 12/1971 | Yuan |
| 4,769,811 | A | 9/1988 | Eckberg, Jr. et al. |
| 5,408,231 | A | 4/1995 | Bowdon |
| 5,491,690 | A | 2/1996 | Alfonsi et al. |

(Continued)

FOREIGN PATENT DOCUMENTS

| | | |
|---|---|---|
| CN | 103716123 | 4/2014 |
| CN | 103716137 | 4/2014 |

(Continued)

OTHER PUBLICATIONS

3GPP TR 23.401 V9.5.0 (Jun. 2010) Technical Specification: Group Services and Systems Aspects; General Packet Radio Service (GPRS) Enhancements for Evolved Universal Terrestrial Radio Access Network (E-UTRAN) Access (Release 9), 3rd Generation Partnership Project (3GPP), 650 Route des Lucioles—Sophia Antipolis Valbonne—France, Jun. 2010; 259 pages.

(Continued)

*Primary Examiner* — Saba Tsegaye
(74) *Attorney, Agent, or Firm* — Polsinelli PC (57) ABSTRACT

Systems, methods, and computer-readable media are provided for facilitating the implementation of an operations, administration, and management (OAM) protocol in a network overlay environment. In particular, aspects of the technology facilitating the transport of OAM communications across overlay environments of different types. Aspects of the technology can include steps for receiving a packet comprising an OAM payload, and encapsulating the packet with an OAM transport header, wherein the transport header is configured to be read by transit nodes of different overlay types.

11 Claims, 7 Drawing Sheets

(56) References Cited

U.S. PATENT DOCUMENTS

| | | |
|---|---|---|
| 5,557,609 A * | 9/1996 | Shobatake .............. H04L 49/30 370/395.62 |
| 5,600,638 A | 2/1997 | Bertin et al. |
| 5,687,167 A | 11/1997 | Bertin et al. |
| 6,115,384 A | 9/2000 | Parzych |
| 6,167,438 A | 12/2000 | Yates et al. |
| 6,400,681 B1 | 6/2002 | Bertin et al. |
| 6,661,797 B1 | 12/2003 | Goel et al. |
| 6,687,229 B1 | 2/2004 | Kataria et al. |
| 6,799,270 B1 | 9/2004 | Bull et al. |
| 6,888,828 B1 | 5/2005 | Partanen et al. |
| 6,993,593 B2 | 1/2006 | Iwata |
| 7,027,408 B2 | 4/2006 | Nabkel et al. |
| 7,062,567 B2 | 6/2006 | Benitez et al. |
| 7,095,715 B2 | 8/2006 | Buckman et al. |
| 7,096,212 B2 | 8/2006 | Tribble et al. |
| 7,139,239 B2 | 11/2006 | Mcfarland et al. |
| 7,165,107 B2 | 1/2007 | Pouyoul et al. |
| 7,197,008 B1 | 3/2007 | Shabtay et al. |
| 7,197,660 B1 | 3/2007 | Liu et al. |
| 7,209,435 B1 | 4/2007 | Kuo et al. |
| 7,227,872 B1 | 6/2007 | Biswas et al. |
| 7,231,462 B2 | 6/2007 | Berthaud et al. |
| 7,333,990 B1 | 2/2008 | Thiagarajan et al. |
| 7,443,796 B1 | 10/2008 | Albert et al. |
| 7,458,084 B2 | 11/2008 | Zhang et al. |
| 7,472,411 B2 | 12/2008 | Wing et al. |
| 7,486,622 B2 | 2/2009 | Regan et al. |
| 7,536,396 B2 | 5/2009 | Johnson et al. |
| 7,552,201 B2 | 6/2009 | Areddu et al. |
| 7,558,261 B2 | 7/2009 | Arregoces et al. |
| 7,567,504 B2 | 7/2009 | Darling et al. |
| 7,571,470 B2 | 8/2009 | Arregoces et al. |
| 7,573,879 B2 | 8/2009 | Narad et al. |
| 7,610,375 B2 | 10/2009 | Portolani et al. |
| 7,643,468 B1 | 1/2010 | Arregoces et al. |
| 7,644,182 B2 | 1/2010 | Banerjee et al. |
| 7,647,422 B2 | 1/2010 | Singh et al. |
| 7,657,898 B2 | 2/2010 | Sadiq |
| 7,657,940 B2 | 2/2010 | Portolani et al. |
| 7,668,116 B2 | 2/2010 | Wijnands et al. |
| 7,684,321 B2 | 3/2010 | Muirhead et al. |
| 7,738,469 B1 | 6/2010 | Shekokar et al. |
| 7,751,409 B1 | 7/2010 | Carolan |
| 7,793,157 B2 | 9/2010 | Bailey et al. |
| 7,814,284 B1 | 10/2010 | Glass et al. |
| 7,831,693 B2 | 11/2010 | Lai |
| 7,852,785 B2 | 12/2010 | Lund et al. |
| 7,860,095 B2 | 12/2010 | Forissier et al. |
| 7,860,100 B2 | 12/2010 | Khalid et al. |
| 7,895,425 B2 | 2/2011 | Khalid et al. |
| 7,899,012 B2 | 3/2011 | Ho et al. |
| 7,899,861 B2 | 3/2011 | Feblowitz et al. |
| 7,907,595 B2 | 3/2011 | Khanna et al. |
| 7,908,480 B2 | 3/2011 | Firestone et al. |
| 7,983,174 B1 | 7/2011 | Monaghan et al. |
| 7,990,847 B1 | 8/2011 | Leroy et al. |
| 8,000,329 B2 | 8/2011 | Fendick et al. |
| 8,018,938 B1 | 9/2011 | Fromm et al. |
| 8,094,575 B1 | 1/2012 | Vadlakonda et al. |
| 8,095,683 B2 | 1/2012 | Balasubramaniam Chandra |
| 8,116,307 B1 | 2/2012 | Thesayi et al. |
| 8,166,465 B2 | 4/2012 | Feblowitz et al. |
| 8,180,909 B2 | 5/2012 | Hartman et al. |
| 8,191,119 B2 | 5/2012 | Wing et al. |
| 8,195,774 B2 | 6/2012 | Lambeth et al. |
| 8,280,354 B2 | 10/2012 | Smith et al. |
| 8,281,302 B2 | 10/2012 | Durazzo et al. |
| 8,291,108 B2 | 10/2012 | Raja et al. |
| 8,305,900 B2 | 11/2012 | Bianconi |
| 8,311,045 B2 | 11/2012 | Quinn et al. |
| 8,316,457 B1 | 11/2012 | Paczkowski et al. |
| 8,355,332 B2 | 1/2013 | Beaudette et al. |
| 8,442,043 B2 | 5/2013 | Sharma et al. |
| 8,451,817 B2 | 5/2013 | Cheriton |
| 8,464,336 B2 | 6/2013 | Wei et al. |
| 8,473,981 B1 | 6/2013 | Gargi |
| 8,479,298 B2 | 7/2013 | Keith et al. |
| 8,498,414 B2 | 7/2013 | Rossi |
| 8,520,672 B2 | 8/2013 | Guichard et al. |
| 8,601,152 B1 | 12/2013 | Chou |
| 8,605,588 B2 | 12/2013 | Sankaran et al. |
| 8,612,612 B1 | 12/2013 | Dukes et al. |
| 8,627,328 B2 | 1/2014 | Mousseau et al. |
| 8,645,952 B2 | 2/2014 | Biswas et al. |
| 8,676,965 B2 | 3/2014 | Gueta |
| 8,676,980 B2 | 3/2014 | Kreeger et al. |
| 8,700,892 B2 | 4/2014 | Bollay et al. |
| 8,724,466 B2 | 5/2014 | Kenigsberg et al. |
| 8,730,980 B2 | 5/2014 | Bagepalli et al. |
| 8,743,885 B2 | 6/2014 | Khan et al. |
| 8,751,420 B2 | 6/2014 | Hjelm et al. |
| 8,762,534 B1 | 6/2014 | Hong et al. |
| 8,762,707 B2 | 6/2014 | Killian et al. |
| 8,792,490 B2 | 7/2014 | Jabr et al. |
| 8,793,400 B2 | 7/2014 | Mcdysan et al. |
| 8,812,730 B2 | 8/2014 | Vos et al. |
| 8,819,419 B2 | 8/2014 | Carlson et al. |
| 8,825,070 B2 | 9/2014 | Akhtar et al. |
| 8,830,834 B2 | 9/2014 | Sharma et al. |
| 8,904,037 B2 | 12/2014 | Haggar et al. |
| 8,984,284 B2 | 3/2015 | Purdy, Sr. et al. |
| 9,001,827 B2 | 4/2015 | Appenzeller |
| 9,071,533 B2 | 6/2015 | Hui et al. |
| 9,077,661 B2 | 7/2015 | Andreasen et al. |
| 9,088,584 B2 | 7/2015 | Feng et al. |
| 9,130,872 B2 | 9/2015 | Kumar et al. |
| 9,143,438 B2 | 9/2015 | Khan et al. |
| 9,160,797 B2 | 10/2015 | Mcdysan |
| 9,178,812 B2 | 11/2015 | Guichard et al. |
| 9,189,285 B2 | 11/2015 | Ng et al. |
| 9,203,711 B2 | 12/2015 | Agarwal et al. |
| 9,253,274 B2 | 2/2016 | Quinn et al. |
| 9,300,579 B2 | 3/2016 | Frost et al. |
| 9,300,585 B2 | 3/2016 | Kumar et al. |
| 9,311,130 B2 | 4/2016 | Christenson et al. |
| 9,319,324 B2 | 4/2016 | Beheshti-Zavareh et al. |
| 9,325,565 B2 | 4/2016 | Yao et al. |
| 9,338,097 B2 | 5/2016 | Anand et al. |
| 9,344,337 B2 | 5/2016 | Kumar et al. |
| 9,374,297 B2 | 6/2016 | Bosch et al. |
| 9,379,931 B2 | 6/2016 | Bosch et al. |
| 9,385,950 B2 | 7/2016 | Quinn et al. |
| 9,398,486 B2 | 7/2016 | La Roche, Jr. et al. |
| 9,407,540 B2 | 8/2016 | Kumar et al. |
| 9,413,655 B2 | 8/2016 | Shatzkamer et al. |
| 9,424,065 B2 | 8/2016 | Singh et al. |
| 9,436,443 B2 | 9/2016 | Chiosi et al. |
| 9,444,675 B2 | 9/2016 | Guichard et al. |
| 9,473,570 B2 | 10/2016 | Bhanujan et al. |
| 9,479,443 B2 | 10/2016 | Bosch et al. |
| 9,491,094 B2 | 11/2016 | Patwardhan et al. |
| 9,537,836 B2 | 1/2017 | Maller et al. |
| 9,558,029 B2 | 1/2017 | Behera et al. |
| 9,559,970 B2 | 1/2017 | Kumar et al. |
| 9,571,405 B2 | 2/2017 | Pignataro et al. |
| 9,608,896 B2 | 3/2017 | Kumar et al. |
| 9,614,739 B2 | 4/2017 | Kumar et al. |
| 9,660,909 B2 | 5/2017 | Guichard et al. |
| 9,723,106 B2 | 8/2017 | Shen et al. |
| 9,774,533 B2 | 9/2017 | Zhang et al. |
| 9,794,379 B2 | 10/2017 | Kumar et al. |
| 9,882,776 B2 | 1/2018 | Aybay et al. |
| 9,929,945 B2 | 3/2018 | Schultz et al. |
| 10,003,530 B2 | 6/2018 | Zhang et al. |
| 2001/0023442 A1 | 9/2001 | Masters |
| 2002/0085562 A1 * | 7/2002 | Hufferd .................. H04L 69/16 370/392 |
| 2002/0131362 A1 | 9/2002 | Callon |
| 2002/0156893 A1 | 10/2002 | Pouyoul et al. |
| 2002/0167935 A1 | 11/2002 | Nabkel et al. |
| 2003/0023879 A1 | 1/2003 | Wray |
| 2003/0026257 A1 | 2/2003 | Xu et al. |
| 2003/0037070 A1 | 2/2003 | Marston |

(56) References Cited

U.S. PATENT DOCUMENTS

| | | |
|---|---|---|
| 2003/0088698 A1 | 5/2003 | Singh et al. |
| 2003/0110081 A1 | 6/2003 | Tosaki et al. |
| 2003/0120816 A1 | 6/2003 | Berthaud et al. |
| 2003/0214913 A1 | 11/2003 | Kan et al. |
| 2003/0226142 A1 | 12/2003 | Rand |
| 2004/0109412 A1 | 6/2004 | Hansson et al. |
| 2004/0148391 A1 | 7/2004 | Lake, Sr. et al. |
| 2004/0199812 A1 | 10/2004 | Earl |
| 2004/0213160 A1 | 10/2004 | Regan et al. |
| 2004/0264481 A1 | 12/2004 | Darling et al. |
| 2004/0268357 A1 | 12/2004 | Joy et al. |
| 2005/0044197 A1 | 2/2005 | Lai |
| 2005/0058118 A1 | 3/2005 | Davis |
| 2005/0060572 A1 | 3/2005 | Kung |
| 2005/0086367 A1 | 4/2005 | Conta et al. |
| 2005/0120101 A1 | 6/2005 | Nocera |
| 2005/0152378 A1 | 7/2005 | Bango et al. |
| 2005/0157645 A1 | 7/2005 | Rabie et al. |
| 2005/0160180 A1 | 7/2005 | Rabje et al. |
| 2005/0204042 A1 | 9/2005 | Banerjee et al. |
| 2005/0210096 A1 | 9/2005 | Bishop et al. |
| 2005/0257002 A1 | 11/2005 | Nguyen |
| 2005/0281257 A1 | 12/2005 | Yazaki et al. |
| 2005/0286540 A1 | 12/2005 | Hurtta et al. |
| 2005/0289244 A1 | 12/2005 | Sahu et al. |
| 2006/0005240 A1 | 1/2006 | Sundarrajan et al. |
| 2006/0031374 A1 | 2/2006 | Lu et al. |
| 2006/0045024 A1 | 3/2006 | Previdi et al. |
| 2006/0074502 A1 | 4/2006 | Mcfarland |
| 2006/0092950 A1 | 5/2006 | Arregoces et al. |
| 2006/0095960 A1 | 5/2006 | Arregoces et al. |
| 2006/0112400 A1 | 5/2006 | Zhang et al. |
| 2006/0155862 A1 | 7/2006 | Kathi et al. |
| 2006/0168223 A1 | 7/2006 | Mishra et al. |
| 2006/0233106 A1 | 10/2006 | Achlioptas et al. |
| 2006/0233155 A1 | 10/2006 | Srivastava |
| 2007/0061441 A1 | 3/2007 | Landis et al. |
| 2007/0067435 A1 | 3/2007 | Landis et al. |
| 2007/0094397 A1 | 4/2007 | Krelbaum et al. |
| 2007/0143851 A1 | 6/2007 | Nicodemus et al. |
| 2007/0237147 A1 | 10/2007 | Quinn et al. |
| 2007/0250836 A1 | 10/2007 | Li et al. |
| 2008/0056153 A1 | 3/2008 | Liu |
| 2008/0080509 A1 | 4/2008 | Khanna et al. |
| 2008/0080517 A1 | 4/2008 | Roy et al. |
| 2008/0170542 A1 | 7/2008 | Hu |
| 2008/0177896 A1 | 7/2008 | Quinn et al. |
| 2008/0181118 A1 | 7/2008 | Sharma et al. |
| 2008/0196083 A1 | 8/2008 | Parks et al. |
| 2008/0209039 A1 | 8/2008 | Tracey et al. |
| 2008/0219287 A1 | 9/2008 | Krueger et al. |
| 2008/0225710 A1 | 9/2008 | Raja et al. |
| 2008/0291910 A1 | 11/2008 | Tadimeti et al. |
| 2009/0003364 A1 | 1/2009 | Fendick et al. |
| 2009/0006152 A1 | 1/2009 | Timmerman et al. |
| 2009/0037713 A1 | 2/2009 | Khalid et al. |
| 2009/0094684 A1 | 4/2009 | Chinnusamy et al. |
| 2009/0204612 A1 | 8/2009 | Keshavarz-nia et al. |
| 2009/0271656 A1 | 10/2009 | Yokota et al. |
| 2009/0300207 A1 | 12/2009 | Giaretta et al. |
| 2009/0305699 A1 | 12/2009 | Deshpande et al. |
| 2009/0328054 A1 | 12/2009 | Paramasivam et al. |
| 2010/0058329 A1 | 3/2010 | Durazzo et al. |
| 2010/0063988 A1 | 3/2010 | Khalid |
| 2010/0080226 A1 | 4/2010 | Khalid |
| 2010/0165985 A1 | 7/2010 | Sharma et al. |
| 2010/0191612 A1 | 7/2010 | Raleigh |
| 2010/0211658 A1 | 8/2010 | Hoogerwerf et al. |
| 2011/0023090 A1 | 1/2011 | Asati et al. |
| 2011/0032833 A1 | 2/2011 | Zhang et al. |
| 2011/0055845 A1 | 3/2011 | Nandagopal et al. |
| 2011/0131338 A1 | 6/2011 | Hu |
| 2011/0137991 A1 | 6/2011 | Russell |
| 2011/0142056 A1 | 6/2011 | Manoj |
| 2011/0161494 A1 | 6/2011 | Mcdysan et al. |
| 2011/0222412 A1 | 9/2011 | Kompella |
| 2011/0255538 A1 | 10/2011 | Srinivasan et al. |
| 2011/0267947 A1 | 11/2011 | Dhar et al. |
| 2012/0131662 A1 | 5/2012 | Kuik et al. |
| 2012/0147894 A1 | 6/2012 | Mulligan et al. |
| 2012/0324442 A1 | 12/2012 | Barde |
| 2012/0331135 A1 | 12/2012 | Alon et al. |
| 2013/0003735 A1 | 1/2013 | Chao et al. |
| 2013/0003736 A1 | 1/2013 | Szyszko et al. |
| 2013/0040640 A1 | 2/2013 | Chen et al. |
| 2013/0044636 A1 | 2/2013 | Koponen et al. |
| 2013/0121137 A1 | 5/2013 | Feng et al. |
| 2013/0124708 A1 | 5/2013 | Lee et al. |
| 2013/0163594 A1 | 6/2013 | Sharma et al. |
| 2013/0163606 A1 | 6/2013 | Bagepalli et al. |
| 2013/0238806 A1 | 9/2013 | Moen |
| 2013/0272305 A1 | 10/2013 | Lefebvre et al. |
| 2013/0311675 A1 | 11/2013 | Kancherla |
| 2013/0329584 A1 | 12/2013 | Ghose et al. |
| 2014/0010083 A1 | 1/2014 | Hamdi et al. |
| 2014/0010096 A1 | 1/2014 | Kamble et al. |
| 2014/0036730 A1 | 2/2014 | Nellikar et al. |
| 2014/0050223 A1 | 2/2014 | Foo et al. |
| 2014/0067758 A1 | 3/2014 | Boldyrev et al. |
| 2014/0105062 A1 | 4/2014 | McDysan et al. |
| 2014/0181267 A1 | 6/2014 | Wadkins et al. |
| 2014/0254603 A1 | 9/2014 | Banavalikar et al. |
| 2014/0259012 A1 | 9/2014 | Nandlall et al. |
| 2014/0279863 A1 | 9/2014 | Krishnamurthy et al. |
| 2014/0280836 A1 | 9/2014 | Kumar et al. |
| 2014/0317261 A1 | 10/2014 | Shatzkamer et al. |
| 2014/0321459 A1 | 10/2014 | Kumar et al. |
| 2014/0334295 A1 | 11/2014 | Guichard et al. |
| 2014/0344439 A1 | 11/2014 | Kempf et al. |
| 2014/0362682 A1 | 12/2014 | Guichard et al. |
| 2014/0362857 A1 | 12/2014 | Guichard et al. |
| 2014/0369209 A1 | 12/2014 | Khurshid et al. |
| 2014/0376558 A1 | 12/2014 | Rao et al. |
| 2015/0003455 A1 | 1/2015 | Haddad et al. |
| 2015/0012584 A1 | 1/2015 | Lo et al. |
| 2015/0012988 A1 | 1/2015 | Jeng et al. |
| 2015/0029871 A1 | 1/2015 | Frost et al. |
| 2015/0032871 A1 | 1/2015 | Allan et al. |
| 2015/0052516 A1 | 2/2015 | French et al. |
| 2015/0071285 A1 | 3/2015 | Kumar et al. |
| 2015/0074276 A1 | 3/2015 | DeCusatis et al. |
| 2015/0082308 A1 | 3/2015 | Kiess et al. |
| 2015/0085635 A1 | 3/2015 | Wijnands et al. |
| 2015/0085870 A1 | 3/2015 | Narasimha et al. |
| 2015/0089082 A1 | 3/2015 | Patwardhan et al. |
| 2015/0092564 A1 | 4/2015 | Aldrin |
| 2015/0103827 A1 | 4/2015 | Quinn et al. |
| 2015/0117308 A1 | 4/2015 | Kant |
| 2015/0124622 A1 | 5/2015 | Kovvali et al. |
| 2015/0131484 A1* | 5/2015 | Aldrin ............ H04L 41/12 370/254 |
| 2015/0131660 A1 | 5/2015 | Shepherd et al. |
| 2015/0156035 A1 | 6/2015 | Foo et al. |
| 2015/0180725 A1 | 6/2015 | Varney et al. |
| 2015/0180767 A1 | 6/2015 | Tam et al. |
| 2015/0181309 A1 | 6/2015 | Shepherd et al. |
| 2015/0188949 A1 | 7/2015 | Mahaffey et al. |
| 2015/0195197 A1 | 7/2015 | Yong et al. |
| 2015/0222516 A1 | 8/2015 | Deval et al. |
| 2015/0222533 A1 | 8/2015 | Birrittella et al. |
| 2015/0236948 A1 | 8/2015 | Dunbar et al. |
| 2015/0319078 A1 | 11/2015 | Lee et al. |
| 2015/0319081 A1 | 11/2015 | Kasturi et al. |
| 2015/0326473 A1 | 11/2015 | Dunbar et al. |
| 2015/0333930 A1 | 11/2015 | Aysola et al. |
| 2015/0334027 A1 | 11/2015 | Bosch et al. |
| 2015/0341285 A1 | 11/2015 | Aysola et al. |
| 2015/0365495 A1 | 12/2015 | Fan et al. |
| 2015/0381465 A1 | 12/2015 | Narayanan et al. |
| 2015/0381557 A1 | 12/2015 | Fan et al. |
| 2016/0028604 A1 | 1/2016 | Chakrabarti et al. |
| 2016/0028640 A1 | 1/2016 | Zhang et al. |
| 2016/0043952 A1 | 2/2016 | Zhang et al. |
| 2016/0050117 A1 | 2/2016 | Voellmy et al. |

(56) References Cited

U.S. PATENT DOCUMENTS

| | | |
|---|---|---|
| 2016/0050132 A1 | 2/2016 | Zhang |
| 2016/0080263 A1 | 3/2016 | Park et al. |
| 2016/0099853 A1 | 4/2016 | Nedeltchev et al. |
| 2016/0119159 A1 | 4/2016 | Zhao et al. |
| 2016/0119253 A1 | 4/2016 | Kang et al. |
| 2016/0127139 A1 | 5/2016 | Tian et al. |
| 2016/0134518 A1 | 5/2016 | Callon et al. |
| 2016/0134535 A1 | 5/2016 | Callon |
| 2016/0139939 A1 | 5/2016 | Bosch et al. |
| 2016/0164776 A1 | 6/2016 | Biancaniello |
| 2016/0165014 A1 | 6/2016 | Nainar et al. |
| 2016/0173373 A1 | 6/2016 | Guichard et al. |
| 2016/0173464 A1 | 6/2016 | Wang et al. |
| 2016/0182336 A1 | 6/2016 | Doctor et al. |
| 2016/0182342 A1 | 6/2016 | Singaravelu et al. |
| 2016/0182684 A1 | 6/2016 | Connor et al. |
| 2016/0212017 A1 | 7/2016 | Li et al. |
| 2016/0226742 A1 | 8/2016 | Apathotharanan et al. |
| 2016/0248685 A1 | 8/2016 | Pignataro et al. |
| 2016/0277250 A1 | 9/2016 | Maes |
| 2016/0285720 A1 | 9/2016 | Mäenpää et al. |
| 2016/0323165 A1 | 11/2016 | Boucadair et al. |
| 2016/0352629 A1 | 12/2016 | Wang et al. |
| 2016/0380966 A1 | 12/2016 | Gunnalan et al. |
| 2017/0019303 A1 | 1/2017 | Swamy et al. |
| 2017/0031804 A1 | 2/2017 | Ciszewski et al. |
| 2017/0078175 A1 | 3/2017 | Xu et al. |
| 2017/0187609 A1 | 6/2017 | Lee et al. |
| 2017/0208000 A1 | 7/2017 | Bosch et al. |
| 2017/0214627 A1 | 7/2017 | Zhang et al. |
| 2017/0237656 A1 | 8/2017 | Gage et al. |
| 2017/0250917 A1 | 8/2017 | Ruckstuhl et al. |
| 2017/0272470 A1 | 9/2017 | Gundamaraju et al. |
| 2017/0279712 A1 | 9/2017 | Nainar et al. |
| 2017/0310611 A1 | 10/2017 | Kumar et al. |
| 2017/0331741 A1 | 11/2017 | Fedyk et al. |
| 2018/0013841 A1 | 1/2018 | Nainar et al. |
| 2018/0026887 A1 | 1/2018 | Nainar et al. |
| 2018/0041470 A1 | 2/2018 | Schultz et al. |
| 2018/0062991 A1 | 3/2018 | Nainar et al. |

FOREIGN PATENT DOCUMENTS

| | | |
|---|---|---|
| EP | 3160073 A1 | 4/2017 |
| JP | 2016149686 | 8/2016 |
| WO | WO-2011029321 A1 | 3/2011 |
| WO | WO 2012/056404 | 5/2012 |
| WO | WO 2015/065353 | 5/2015 |
| WO | WO 2015/180559 | 12/2015 |
| WO | WO 2015/187337 | 12/2015 |
| WO | WO-2016004556 A1 | 1/2016 |
| WO | WO 2016/058245 | 4/2016 |
| WO | WO 2017/011607 | 1/2017 |

OTHER PUBLICATIONS

3GPP TR 23.803 V7.0.0 (Sep. 2005) Technical Specification: Group Services and System Aspects; Evolution of Policy Control and Charging (Release 7), 3rd Generation Partnership Project (3GPP), 650 Route des Lucioles—Sophia Antipolis Val bonne—France, Sep. 2005; 30 pages.

3GPP TS 23.203 V8.9.0 (Mar. 2010) Technical Specification: Group Services and System Aspects; Policy and Charging Control Architecture (Release 8), 3rd Generation Partnership Project (3GPP), 650 Route des Lucioles—Sophia Antipolis Val bonne—France, Mar. 2010; 116 pages.

3GPP TS 23.401 V13.5.0 (Dec. 2015) Technical Specification: 3rd Generation Partnership Project; Technical Specification Group Services and System Aspects; General Packet Radio Service (GPRS) enhancements for Evolved Universal Terrestrial Radio Access Network (E-UTRAN) access (Release 13), 3GPP, 650 Route des Lucioles—Sophia Antipolis Valbonne—France, Dec. 2015.

3GPP TS 29.212 V13.1.0 (Mar. 2015) Technical Specification: 3rd Generation Partnership Project; Technical Specification Group Core Network and Terminals; Policy and Chargig Control (PCC); Reference points (Release 13), 3rd Generation Partnership Project (3GPP), 650 Route des Lucioles—Sophia Antipolis Valbonne—France, Mar. 2015; 230 pages.

U.S. Appl. No. 15/252,028, filed Aug. 30, 2016, entitled "System and Method for Managing Chained Services in a Network Environment," Inventor(s): Hendrikus G.P. Bosch, et al.

P. Quinn, et al., "Network Service Header," Network Working Group, Feb. 14, 2014, 21 pages; https://svn.tools.ietf.org/html/draft-quinn-sfc-nsh-02.

P. Quinn, et al., "Service Function Chaining (SFC) Architecture," Network Working Group, May 5, 2014, 31 pages; https://svn.tools.ietf.org/html/draft-quinn-sfc-arch-05.

International Search Report and Written Opinion from the International Searching Authority, dated Aug. 30, 2017, for the corresponding International Application No. PCT/US2017/040575, 13 pages.

Aldrin, S., et al. "Service Function Chaining Operation, Administration and Maintenance Framework," Internet Engineering Task Force, Oct. 26, 2014, 13 pages.

Author Unknown, "ANSI/SCTE 35 2007 Digital Program Insertion Cueing Message for Cable," Engineering Committee, Digital Video Subcommittee, American National Standard, Society of Cable Telecommunications Engineers, © Society of Cable Telecommunications Engineers, Inc. 2007 All Rights Reserved, 140 Philips Road, Exton, PA 19341; 42 pages.

Author Unknown, "AWS Lambda Developer Guide," Amazon Web Services Inc., May 2017, 416 pages.

Author Unknown, "CEA-708," from Wikipedia, the free encyclopedia, Nov. 15, 2012; 16 pages http://en.wikipedia.org/w/index.php?title=CEA-708&oldid=523143431.

Author Unknown, "Cisco and Intel High-Performance VNFs on Cisco NFV Infrastructure," White Paper, Cisco and Intel, Oct. 2016, 7 pages.

Author Unknown, "Cloud Functions Overview," Cloud Functions Documentation, Mar. 21, 2017, 3 pages; https://cloud.google.com/functions/docs/concepts/overview.

Author Unknown, "Cloud-Native VNF Modelling," Open Source Mano, © ETSI 2016, 18 pages.

Author Unknown, "Digital Program Insertion," from Wikipedia, the free encyclopedia, Jan. 2, 2012; 1 page http://en.wikipedia.org/w/index.php?title=Digital_Program_Insertion&oldid=469076482.

Author Unknown, "Dynamic Adaptive Streaming over HTTP," from Wikipedia, the free encyclopedia, Oct. 25, 2012; 3 pages, http://en.wikipedia.org/w/index.php?title=Dynannic_Adaptive_Streanning_over_HTTP&oldid=519749189.

Author Unknown, "GStreamer and in-band metadata," from RidgeRun Developer Connection, Jun. 19, 2012, 5 pages https://developersidgerun.conn/wiki/index.php/GStreanner_and_in-band_nnetadata.

Author Unknown, "ISO/IEC JTC 1/SC 29, Information Technology—Dynamic Adaptive Streaming over HTTP (DASH)—Part 1: Media Presentation Description and Segment Formats," International Standard © ISO/IEC 2012—All Rights Reserved; Jan. 5, 2012; 131 pages.

Author Unknown, "M-PEG 2 Transmission," © Dr. Gorry Fairhurst, 9 pages [Published on or about Jan. 12, 2012] http://www.erg.abdn.ac.uk/future-net/digital-video/mpeg2-trans.html.

Author Unknown, "MPEG Transport Stream," from Wikipedia, the free encyclopedia, Nov. 11, 2012; 7 pages, http://en.wikipedia.org/w/index.php?title=MPEG_transport_streann&oldid=522468296.

Author Unknown, "Network Functions Virtualisation (NFV); Use Cases," ETSI, GS NFV 001 v1.1.1, Architectural Framework, © European Telecommunications Standards Institute, Oct. 2013, 50 pages.

Author Unknown, "Understanding Azure, A Guide for Developers," Microsoft Corporation, Copyright © 2016 Microsoft Corporation, 39 pages.

Baird, Andrew, et al. "AWS Serverless Multi-Tier Architectures; Using Amazon API Gateway and AWS Lambda," Amazon Web Services Inc., Nov. 2015, 20 pages.

(56) References Cited

OTHER PUBLICATIONS

Boucadair, Mohamed, et al., "Differentiated Service Function Chaining Framework," Network Working Group Internet Draft draft-boucadair-network-function-chaining-03, Aug. 21, 2013, 21 pages.

Cisco Systems, Inc. "Cisco NSH Service Chaining Configuration Guide," Jul. 28, 2017, 11 pages.

Ersue, Mehmet, "ETSI NFV Management and Orchestration—An Overview," Presentation at the IETF# 88 Meeting, Nov. 3, 2013, 14 pages.

Fayaz, Seyed K., et al., "Efficient Network Reachability Analysis using a Succinct Control Plane Representation," 2016, ratul.org, pp. 1-16.

Halpern, Joel, et al., "Service Function Chaining (SFC) Architecture," Internet Engineering Task Force (IETF), Cisco, Oct. 2015, 32 pages.

Hendrickson, Scott, et al. "Serverless Computation with OpenLambda," Elastic 60, University of Wisconson, Madison, Jun. 20, 2016, 7 pages, https://www.usenix.org/system/files/conference/hotcloud16/hendrickson.pdf.

Jiang, Yuanlong, et al., "Fault Management in Service Function Chaining," Network Working Group, China Telecom, Oct. 16, 2015, 13 pages.

Kumar, Surendra, et al., "Service Function Path Optimization: draft-kumar-sfc-sfp-optimization-00.txt," Internet Engineering Task Force, IETF; Standard Working Draft, May 10, 2014, 14 pages.

Penno, Reinaldo, et al. "Packet Generation in Service Function Chains," draft-penno-sfc-packet-03, Apr. 29, 2016, 25 pages.

Penno, Reinaldo, et al. "Services Function Chaining Traceroute," draft-penno-sfc-trace-03, Sep. 30, 2015, 9 pages.

Pierre-Louis, Marc-Arhtur, "OpenWhisk: A quick tech preview," DeveloperWorks Open, IBM, Feb. 22, 2016, modified Mar. 3, 2016, 7 pages; https://developer.ibm.com/open/2016/02/22/openwhisk-a-quick-tech-preview/.

Pujol, Pua Capdevila, "Deployment of NFV and SFC scenarios," EETAC, Master Thesis, Advisor: David Rincon Rivera, Universitat Politecnica De Catalunya, Feb. 17, 2017, 115 pages.

Quinn, Paul, et al., "Network Service Header," Network Working Group, draft-quinn-nsh-00.txt, Jun. 13, 2013, 20 pages.

Quinn, Paul, et al., "Network Service Header," Network Working Group Internet Draft draft-quinn-nsh-01, Jul. 12, 2013, 20 pages.

Wong, Fei, et al., "SMPTE-TT Embedded in ID3 for HTTP Live Streaming, draft-smpte-id3-http-live-streaming-00," Informational Internet Draft, Jun. 2012, 7 pages http://tools.ietf.org/htnnl/draft-snnpte-id3-http-live-streaming-00.

Yadav, Rishi, "What Real Cloud-Native Apps Will Look Like," Crunch Network, posted Aug. 3, 2016, 8 pages; https://techcrunch.com/2016/08/03/what-real-cloud-native-apps-will-look-like/.

Alizadeh, Mohammad, et al., "CONGA: Distributed Congestion-Aware Load Balancing for Datacenters," SIGCOMM '14, Aug. 17-22, 2014, 12 pages.

Author Unknown, "IEEE Standard for the Functional Architecture of Next Generation Service Overlay Networks, IEEE Std. 1903-2011," IEEE, Piscataway, NJ, Oct. 7, 2011; 147 pages.

Author Unknown, "OpenNebula 4.6 User Guide," Jun. 12, 2014, opennebula.org, 87 pages.

Author Unknown, "Service-Aware Network Architecture Based on SDN, NFV, and Network Intelligence," 2014, 8 pages.

Bi, Jing, et al., "Dynamic Provisioning Modeling for Virtualized Multi-tier Applications in Cloud Data Center," 2010 IEEE $3^{rd}$ International Conference on Cloud Computing, Jul. 5, 2010, pp. 370-377, IEEE Computer Society.

Bitar, N., et al., "Interface to the Routing System (I2RS) for the Service Chaining: Use Cases and Requirements," draft-bitar-i2rs-service-chaining-01, Feb. 14, 2014, pp. 1-15.

Bremler-Barr, Anat, et al., "Deep Packet Inspection as a Service," CoNEXT '14, Dec. 2-5, 2014, pp. 271-282.

Cisco Systems, Inc. "Cisco VN-LINK: Virtualization-Aware Networking," 2009, 9 pages.

Dunbar, et al., "Architecture for Chaining Legacy Layer 4-7 Service Functions," IETF Network Working Group Internet Draft, draft-dunbar-sfc-legacy-14-17-chain-architecture-03.txt, Feb. 10, 2014; 17 pages.

Farrel, A., et al., "A Path Computation Element (PCE)—Based Architecture," RFC 4655, Network Working Group, Aug. 2006, 40 pages.

Jiang, Y., et al., "An Architecture of Service Function Chaining," IETF Network Working Group Internet Draft, draft-jiang-sfc-arch-01.txt, Feb. 14, 2014; 12 pages.

Katsikas, Goergios P., et al., "Profiling and accelerating commodity NFV service chains with SCC," The Journal of Systems and Software, vol. 127, Jan. 2017, pp. 12-27.

Kumbhare, Abhijit, et al., "Opendaylight Service Function Chaining Use-Cases," Oct. 14, 2014, 25 pages.

Li, Hongyu, "Service Function Chaining Use Cases", IETF 88 Vancouver, Nov. 7, 2013, 7 pages.

Mortensen, A., et al., "Distributed Denial of Service (DDoS) Open Threat Signaling Requirements," DOTS, Mar. 18, 2016, 16 pages; https://tools.ietf.org/pdf/draft-ietf-dots-requirements-01.pdf.

Newman, David, "Review: FireEye fights off multi-stage malware," Network World, May 5, 2014, 7 pages.

Nguyen, Kim-Khoa, et al. "Distributed Control Plane Architecture of Next Generation IP Routers," IEEE, 2009, 8 pages.

Quinn, P., et al., "Network Service Header," Network Working Group, Mar. 24, 2015, 42 pages; https://tools.ietf.org/pdf/draft-ietf-sfc-nsh-00.pdf.

Quinn, P., et al., "Network Service Chaining Problem Statement," draft-quinn-nsc-problem-statement-03.txt, Aug. 26, 2013, 18 pages.

Quinn, Paul, et al., "Service Function Chaining: Creating a Service Plane via Network Service Headers," IEEE Computer Society, 2014, pp. 38-44.

Zhang, Ying, et al. "StEERING: A Software-Defined Networking for Inline Service Chaining," IEEE, 2013, IEEE, p. 10 pages.

* cited by examiner

| Header | Encapsulation | OAM Marker |
|---|---|---|
| Underlay/Transport | IPv4 | UDP Port |
| | IPv6 | OAM Extension Header |
| | SR/MPLS | RFC4379 |
| | SRv6 | OAM TLV (Policy-list) in SRH |
| | Ethernet | TBD |
| Overlay | IPv4 | UDP Port |
| | IPv6 | OAM Extension Header |
| | SR/MPLS | RFC4379 |
| | SRv6 | OAM TLV (Policy-list) in SRH |
| | Ethernet | TBD |

CLOUD OVERLAY FOR OPERATIONS ADMINISTRATION AND MANAGEMENT

TECHNICAL FIELD

The present technology pertains to implementing the operations, administration, and management (OAM) protocol in an overlay environment, and more specifically to facilitating the transport of OAM communications across different overlay network types.

BACKGROUND

Operations, administration, and management (OAM) is a toolset available for MPLS (multiprotocol label switching), IP (Internet protocol), and Ethernet networks. Some example OAM tools and protocols include ICMP (Internet control message protocol), LSP (label switched path) ping and traceroute, BFD (bidirectional forwarding detection), VCCV (virtual circuit connection verification), IPPM (IP performance metrics), MPLS OAM, and Ethernet OAM. These OAM tools and protocols can be extremely powerful, as they provide various fault detection, fault verification, and performance monitoring capabilities in MPLS, IP, and Ethernet networks, at various layers of the networking stack.

Overlay networks are extremely extensible and increasingly popular networks based on a new layer 2 overlay scheme over a layer 3 network. Overlay networks, such as virtual extensible LAN (VXLAN), support a flexible, large-scale multitenant environment over a shared common physical infrastructure.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure.

Overview

Additional features and advantages of the disclosure are set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure are more fully apparent from the following description and appended claims, or can be learned by the practice of the principles set forth herein.

A computer network can include a system of hardware, software, protocols, and transmission components that collectively allow separate devices to communicate, share data, and access resources, such as software applications. More specifically, a computer network is a geographically distributed collection of nodes interconnected by communication links and segments for transporting data between endpoints, such as personal computers and workstations. Many types of networks are available, ranging from local area networks (LANs) and wide area networks (WANs) to overlay and software-defined networks, such as virtual extensible local area networks (VXLANs), and virtual networks such as virtual LANs (VLANs) and virtual private networks (VPNs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a public WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by intermediate network nodes, such as routers, switches, hubs, or access points (APs), which can effectively extend the size or footprint of the network.

Networks can be segmented into subnetworks to provide a hierarchical, multilevel routing structure. For example, a network can be segmented into subnetworks using subnet addressing to create network segments. This way, a network can allocate various groups of IP addresses to specific network segments and divide the network into multiple logical networks.

In addition, networks can be divided into logical segments called virtual networks, such as VLANs, which connect logical segments. For example, one or more LANs can be logically segmented to form a VLAN. A VLAN allows a group of machines to communicate as if they were in the same physical network, regardless of their actual physical location. Thus, machines located on different physical LANs can communicate as if they were located on the same physical LAN. Interconnections between networks and devices can also be created using routers and tunnels, such as VPN or secure shell (SSH) tunnels. Tunnels can encrypt point-to-point logical connections across an intermediate network, such as a public network like the Internet. This allows secure communications between the logical connections and across the intermediate network. By interconnecting networks, the number and geographic scope of machines interconnected, as well as the amount of data, resources, and services available to users can be increased.

Further, networks can be extended through network virtualization. Network virtualization allows hardware and software resources to be combined in a virtual network. For example, network virtualization can allow multiple numbers of VMs to be attached to the physical network via respective VLANs. The VMs can be grouped according to their respective VLAN, and can communicate with other VMs as well as other devices on the internal or external network.

To illustrate, overlay networks generally allow virtual networks to be created and layered over a physical network infrastructure. Overlay network protocols, such as VXLAN, Network Virtualization using Generic Routing Encapsulation (NVGRE), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs). The VTEPs can tunnel the traffic between an underlay network and any overlay network, such as a VXLAN, an NVGRE, or a STT, for example.

Moreover, overlay networks can include virtual segments, such as VXLAN segments in a VXLAN overlay network, which can include virtual L2 and/or L3 overlay networks over which VMs communicate. The virtual segments can be identified through a virtual network identifier (VNI), such as a VXLAN network identifier, which can specifically identify an associated virtual segment or domain.

Description

Operations, administration, and management (OAM) is a toolset available for MPLS, IP, and Ethernet networks. Some example OAM tools and protocols include ICMP, LSP ping and traceroute, BFD, VCCV, IPPM, MPLS OAM, and Ethernet OAM. These OAM tools and protocols can provide various fault detection, fault verification, and performance monitoring capabilities in MPLS, IP, and Ethernet networks, at various layers of the networking stack.

With the proliferation of various overlay technologies (e.g., VXLN-GPE, VXLAN, MPLS, GRE, etc.), have come a variety of independent OAM solutions, each of which operates according to requirements specific to the respective overlay technology. However, are no common tools that provide end-to-end OAM functionality, for example, to enable an operator to manage network operations across multiple different overlay and/or underlay networks. In some network deployments, a transit node that receives an OAM packet may de-encapsulate the OAM packet, however, if the transit node cannot understand the overlay OAM header (as is common if the packet is intended for a different overlay type), the packet is dropped.

Aspects of the subject technology address the foregoing need by providing an OAM packet communications framework that facilitates packet transport across different overlay types. In particular, aspects of the OAM framework enable overlay and underlay nodes to perform validation and look up irrespective of overlay type.

The OAM framework of the subject technology utilizes a method for encapsulating overlay network traffic with a transport OAM header that includes a pointer to an underlying OAM TLV payload. In particular, the pointer provided in the transport OAM header can include a "OAM TLV offset" that indicates (to a receiving/transmitting node), how many bits of packet data should be skipped to get to the OAM TLV, which carries the TLVs necessary for OAM functionality. By providing a pointer to the OAM TLV, the encapsulation method permits transit nodes of various overlay types to forward traffic (without packet drops), or to perform a desired OAM function as indicated by the TLV payload.

Figure 1:
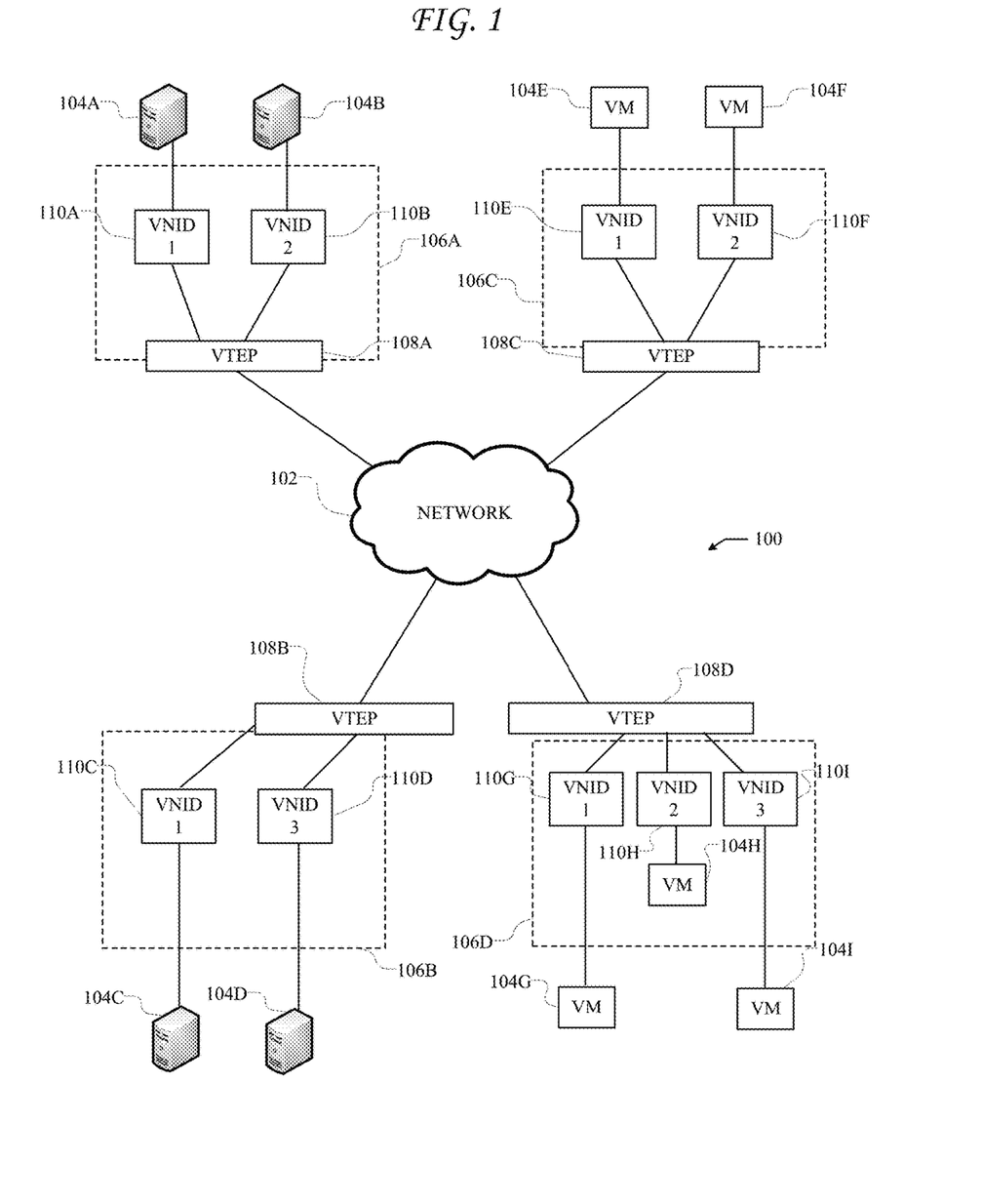
FIG. 1 illustrates a diagram of an example overlay network environment.

FIG. 1 illustrates a diagram of an example overlay network 100. Overlay network 100 uses an overlay protocol, such as VXLAN (virtual extensible LAN), NVGRE (Network Virtualization using Generic Routing Encapsulation), or STT (stateless transport tunneling), to encapsulate traffic in L2 and/or L3 packets which can cross overlay L3 boundaries in the network.

The overlay network 100 can include a network 102, which can represent the core, physical network and/or fabric. In some cases, network 102 can include an IP and/or MPLS network. Moreover, network 102 can be a service provider network. For example, network 102 can be an IP and/or MPLS service provider network.

Overlay network 100 can include devices 106A-D interconnected via network 102. Devices 106A-D can include virtual tunnel end points 108A-D, which can be physical or virtual nodes or switches configured to encapsulate and de-encapsulate data traffic according to a specific overlay protocol of the network 100, for the various virtual network identifiers (VNIDs) 110A-D. Devices 106A-D can include servers containing a VTEP functionality, hypervisors, and physical network devices, such as switches, configured with a virtual tunnel endpoint functionality. For example, devices 106A and 106B can be physical switches, such as top-of-rack (ToR) switches, configured to run VTEPs 108A-B. Here, devices 106A and 106B can be connected to servers 104A-D which, in some cases, can include virtual workloads through VMs loaded on the servers.

In some embodiments, network 100 can be a VXLAN network, and virtual tunnel end points 108A-D can be VXLAN tunnel end points (VTEPs). However, as one of ordinary skill in the art will readily recognize, overlay network 100 can represent any type of overlay or software-defined network, as previously mentioned.

The VNIDs can represent the segregated virtual networks in overlay network 100. Each of the overlay tunnels (VTEPs 108A-D) can be coupled with one or more VNIDs. For example, VTEP 108A can be coupled with virtual or physical devices or workloads residing in VNIDs 1 and 2; VTEP 108B can be coupled with virtual or physical devices or workloads residing in VNIDs 1 and 3; VTEP 108C can be coupled with virtual or physical devices or workloads residing in VNIDs 1 and 2; and VTEP 108D can be coupled with virtual or physical devices or workloads residing in VNIDs 1, 2, and 3. As one of ordinary skill in the art will readily recognize, any particular VTEP can, in other embodiments, be coupled with more or less VNIDs than the VNIDs illustrated in FIG. 1.

The traffic in overlay network 100 can be segregated logically according to specific VNIDs. This way, traffic intended for VNID 1 can be accessed by devices residing in VNID 1, while other devices residing in other VNIDs (e.g., VNIDs 2 and 3) can be prevented from accessing such traffic. In other words, devices or endpoints in specific VNIDs can communicate with other devices or endpoints in the same specific VNIDs, while traffic from separate VNIDs can be isolated to prevent devices or endpoints in other specific VNIDs from accessing traffic in different VNIDs.

Each of the servers 104A-D and VMs 104E-L can be associated with a respective VNID or virtual segment, and communicate with other servers or VMs residing in the same VNID or virtual segment. For example, server 104A can communicate with server 104C and VM 104E because they all reside in the same VNID, viz., VNID 1. Similarly, server 101B can communicate with VMs 104F, 104H, and 104L because they all reside in VNID 2.

Each of the servers 104A-D and VMs 104E-L can represent a single server or VM, but can also represent multiple servers or VMs, such as a cluster of servers or VMs. Moreover, VMs 104E-L can host virtual workloads, which can include application workloads, resources, and services, for example. On the other hand, servers 104A-D can host local workloads on a local storage and/or a remote storage, such as a remote database. However, in some cases, servers 104A-D can similarly host virtual workloads through VMs residing on the servers 104A-D.

VTEPs 108A-D can encapsulate packets directed at the various VNIDs 1-3 in the overlay network 100 according to the specific overlay protocol implemented, such as VXLAN, so traffic can be properly transmitted to the correct VNID and recipient(s) (i.e., server or VM). Moreover, when a switch, router, VTEP, or any other network device receives a packet to be transmitted to a recipient in the overlay network 100, it can consult a routing table or virtual routing and forwarding (VRF) table, such as a lookup table, to determine where such packet needs to be transmitted so the traffic reaches the appropriate recipient. For example, if VTEP 108A receives a packet from an endpoint that is intended for VM 104E, VTEP 108A can consult a routing table that maps the intended VM, VM 104E, to a specific network device (e.g., VTEP 108C) that is configured to handle communications intended for endpoint that VM (e.g., VM 104E). VTEP 108A might not initially know, when it receives the packet from the endpoint, that such packet should be transmitted to VTEP 108C in order to reach VM 104E. Thus, by consulting the routing table, VTEP 108A can lookup VM 104E, which is the intended recipient, and determine that the packet should be transmitted to VTEP 108C, as specified in the routing table based on endpoint-to-switch mappings or bindings, so the packet can be transmitted to, and received by, VM 104E as expected.

As one of ordinary skill in the art will readily recognize, the examples provided above are non-limiting examples provided for explanation purposes, and can include other variations of protocols, topologies, or devices.

Figure 2A:
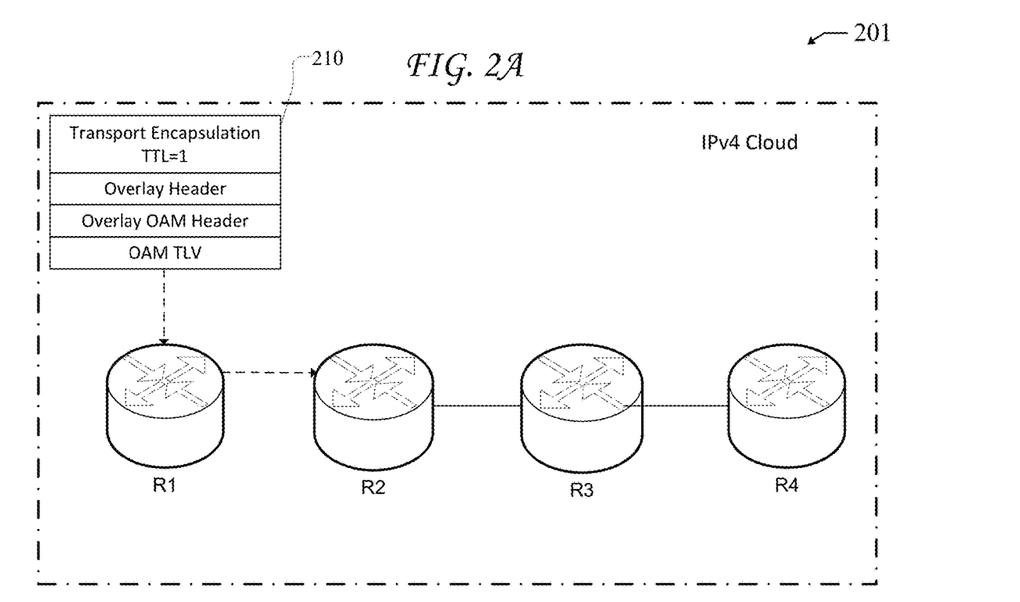
FIG. 2A illustrates an example of an overlay network deployment in a cloud environment.

FIG. 2A illustrates an example of an overlay deployment in a cloud environment. Specifically, FIG. 2A illustrates an example of an IPv4 cloud deployment 201 that includes multiple network nodes (e.g., overlay nodes R1, R2, R3, and R4). In cloud deployment 201, network nodes R1-R4 can transverse various network overlay types.

In practice, network node R1 receives OAM packet 210 that is addressed for destination node R4. As illustrated, OAM packet 210 includes a variety of data fields including: a transport encapsulation layer, an overlay header, an overlay OAM header, and an OAM TLV field. In this example, OAM packet 210 is configured to cause the transit nodes to perform a traceroute function. As such, once OAM packet 210 is received by node R1, the TTL is decremented (e.g., to 0) and the packet is decapsulated such that R2 can read the overlay header. However, in scenarios wherein a transit node (e.g., R2) correspond with an overlay type different from that of the packet's overlay header, the transit node cannot read the overlay header and the packet is dropped. Therefore, in the illustrated scenario, transit node R2 drops OAM packet 210 without issuing a reply to R1, and without forwarding OAM packet 210 toward its intended destination at R4.

As discussed in further detail below, aspects of the subject technology employ an encapsulation method that inserts a transport OAM header into the OAM packet, providing instructions to a receiving transit node as to how to read the requisite data fields.

Figure 2B:
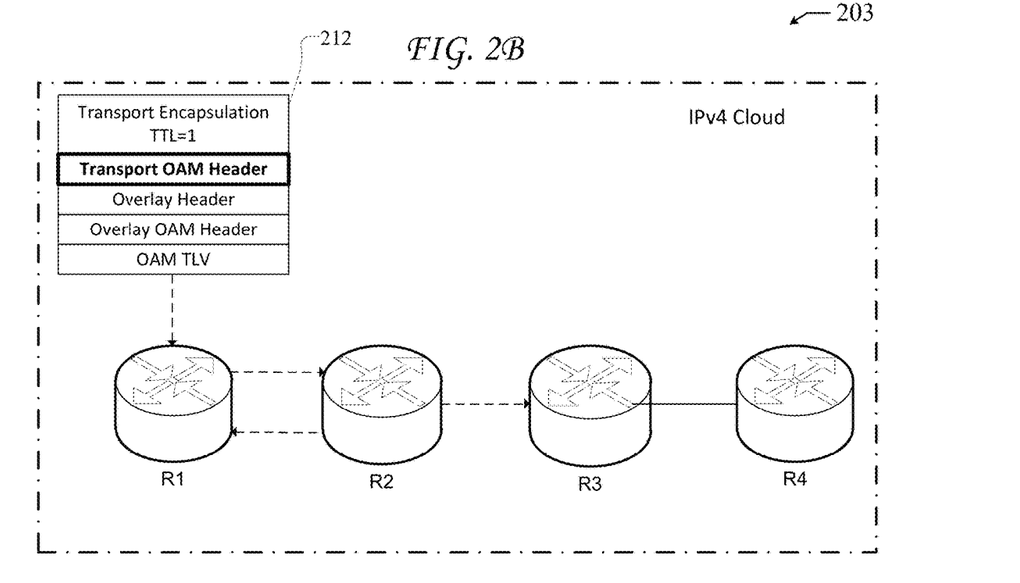
FIG. 2B illustrates an example of an overlay deployment in a cloud environment that utilizes an operations administration and management (OAM) communications solution, according to some aspects of the technology.

FIG. 2B illustrates an example of an overlay deployment in a different cloud environment 203 that utilizes an operations administration and management (OAM) communications solution. Although the architecture of cloud environment 203 is similar to that of cloud environment 201, OAM packet 212 includes a transport OAM header configured to provide transit nodes with information necessary to access the OAM TLV data field. By providing transit nodes with access to the OAM TLV, the nodes can effectively "skip" over data fields they are not configured to read and carry out operations corresponding with the intended OAM functionality without packet drop.

In the OAM packet transit scenario illustrated by FIG. 2B, OAM packet 212 is passed from transit node R1 to R2 where TLV is decremented, packet 212 is decapsulated, and the transport OAM header is read by R2. As discussed in further detail below, the transport OAM header contains a pointer that indicates to the transit node (R2) a number of bits that need to be skipped in the packet header fields in order to reach the OAM TLV, i.e., the packet payload which contains instructions for executing OAM functions.

In the illustrated example, an OAM trace route function is performed by R2, with a reply sent to R1 and a forwarding of OAM packet 212 to the next transit node, e.g., R3. By providing OAM packet 212 with an encapsulation (e.g., a transport OAM header encapsulation), intermediate transit nodes of are able to access the OAM TLV irrespective of their overlay implementation type.

Figure 3A:
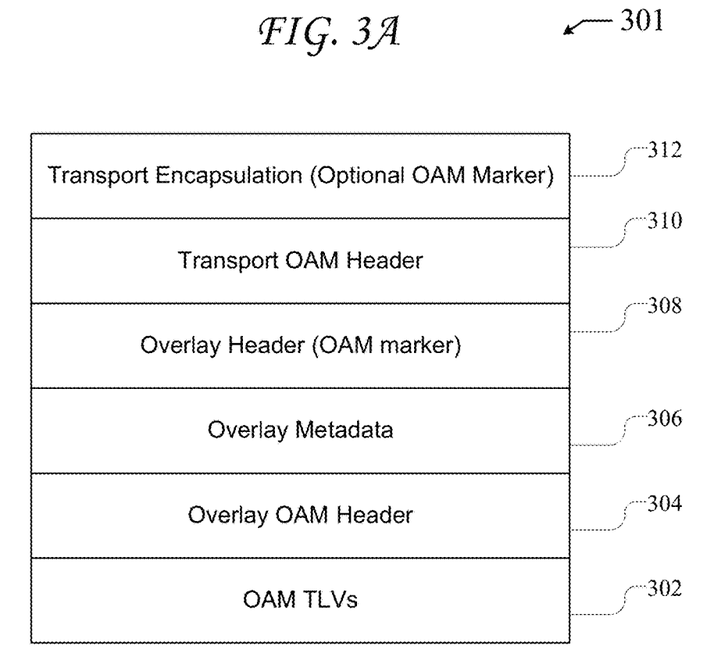
FIGS. 3A and B illustrate example OAM packets including a transport OAM encapsulation layer, according to some aspects of the technology.

FIG. 3A illustrates an example OAM packet 301 utilizing a transport OAM encapsulation layer. As illustrated, OAM packet 301 includes multiple data fields including: a transport encapsulation field (e.g. an optional OAM marker) 312, a transport OAM header 310, an overlay header (OAM marker) 308, overlay metadata 306, an overlay OAM header 304, and in OAM TLV 302.

It is understood that additional (or fewer) data fields can be included in OAM packet without departing from the scope of the subject technology. For example overlay metadata 306 may be optionally included.

Figure 3B:
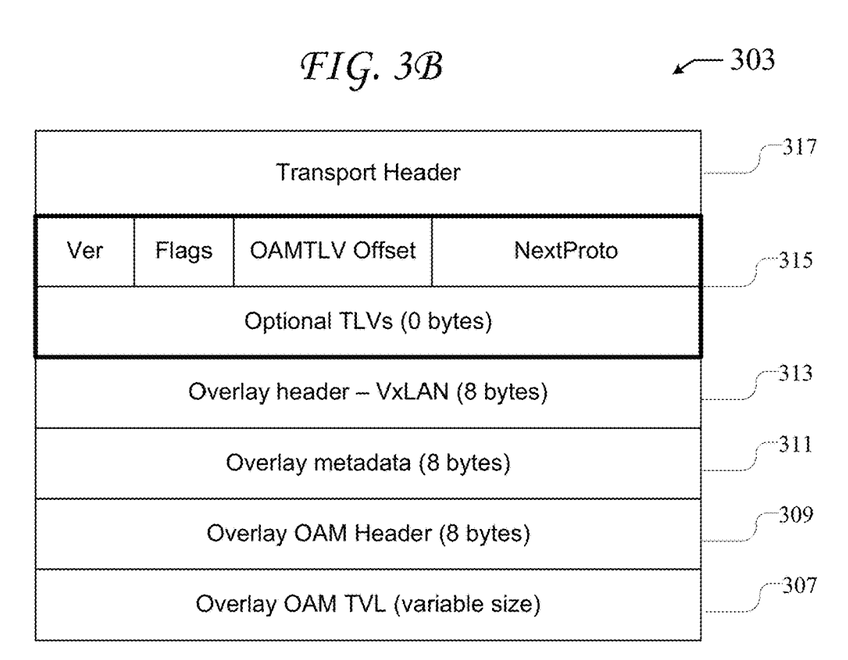

FIG. 3B illustrates a more detailed example of an OAM packet structure. In particular FIG. 3B illustrates an example data structure and data size of various fields of OAM packet 303. As illustrated OAM packet 303 includes an overlay OAM TLV 307, which may be variable in size, an overlay OAM header 309 (e.g., 8 bytes), overlay metadata 311 (e.g., 8 bytes), and overlay header 313 (e.g. for a VxLAN of size 8 bytes), a transport OAM header 315, at a transport header 317.

In the illustrated example transfer OAM header 315 includes multiple data segments including "ver," "flags," "OAM TLV offset," "NextProto", and one or more optional TLVs. It is understood that a greater (or fewer) number of data segments can be included in transport OAM header 315 without departing from the scope of the technology. In the example depicted by in FIG. 3B, the "ver" data segment can indicate a version (in some implementations a version designation can be useful for future extension); "flags" can indicate a data field data pertaining to one or more packet flags; "NextProto" can be used to provide data indicating a next protocol identifier; and "OAMTLVOffset" indicates a size of the packet header preceding the OAM TLV. In this example, OAMTLVOffset is equal to the size of NextProto+Optional TLV+Overlay Header+Overlay Metadata+Overlay OAM header (in bytes).

Figure 3C:
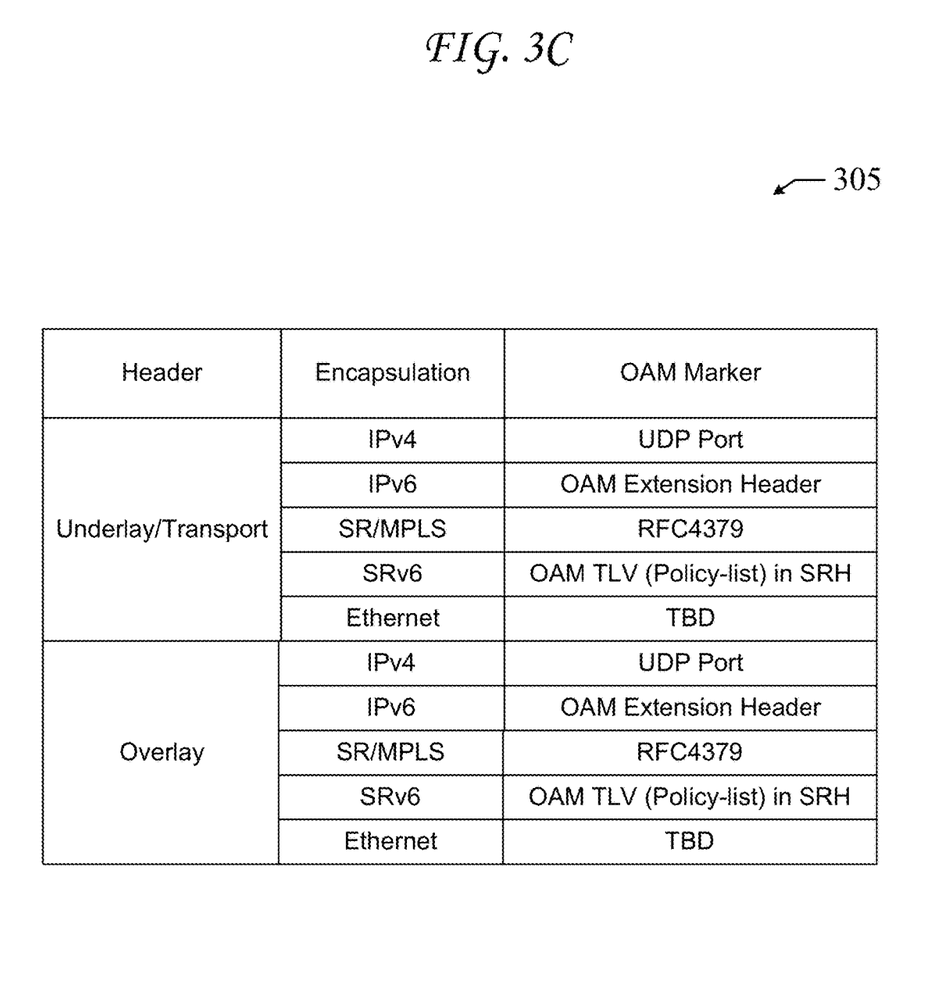
FIG. 3C illustrates a table of example packet headers, encapsulation types and corresponding OAM markers, according to some aspects of the technology.

FIG. 3C illustrates a table 305 of example packet headers, encapsulation types and corresponding OAM markers, according to some aspects of the technology. Although table 305 includes common header (underlay and overlay), encapsulation, and OAM marker types, various other protocols and overlay solutions may be utilized without departing from the scope of the technology.

Figure 4:
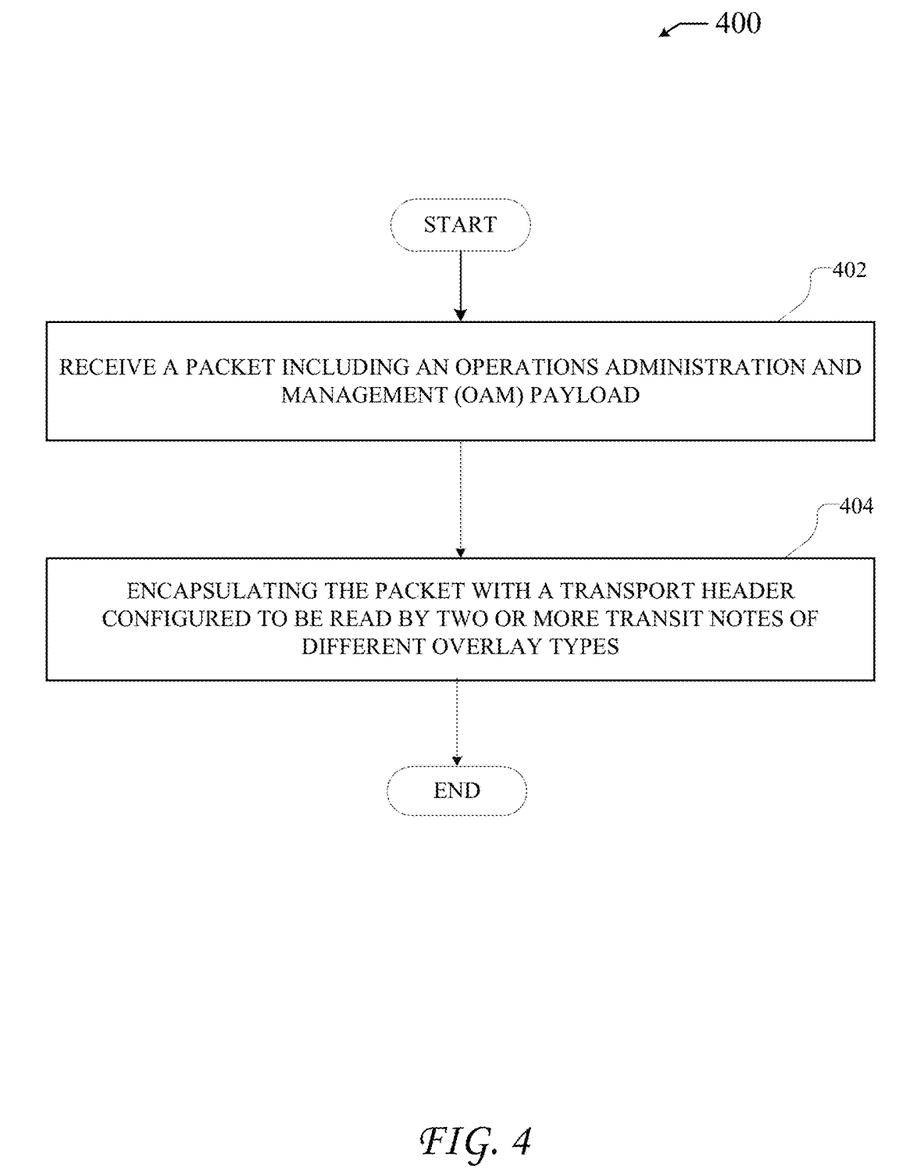
FIG. 4 illustrates steps of an example method for implementing an overlay OAM encapsulation scheme, according to some aspects of the technology.

FIG. 4 illustrates steps of an example method 400 for implementing an overlay OAM encapsulation scheme, according to some aspects of the technology. Method 400 begins with step 402 in which a packet is received that includes an operations administration and management (OAM) payload. The OAM payload can correspond with the OAM TLV data field of OAM packets 301 and 303, discussed above.

Subsequently, in step 404 the OAM packet is encapsulated with a transport header (e.g., a transport OAM header) that is configured to be read by transit nodes of different overlay types. As discussed above, the transport OAM header can include a pointer for indicating a location of the packets OAM TLV data field to a transit node. That is, in some aspects, the pointer of the transport header contain data indicating asize (or bit length) of the OAM packet header.

Example Devices

Figure 5:
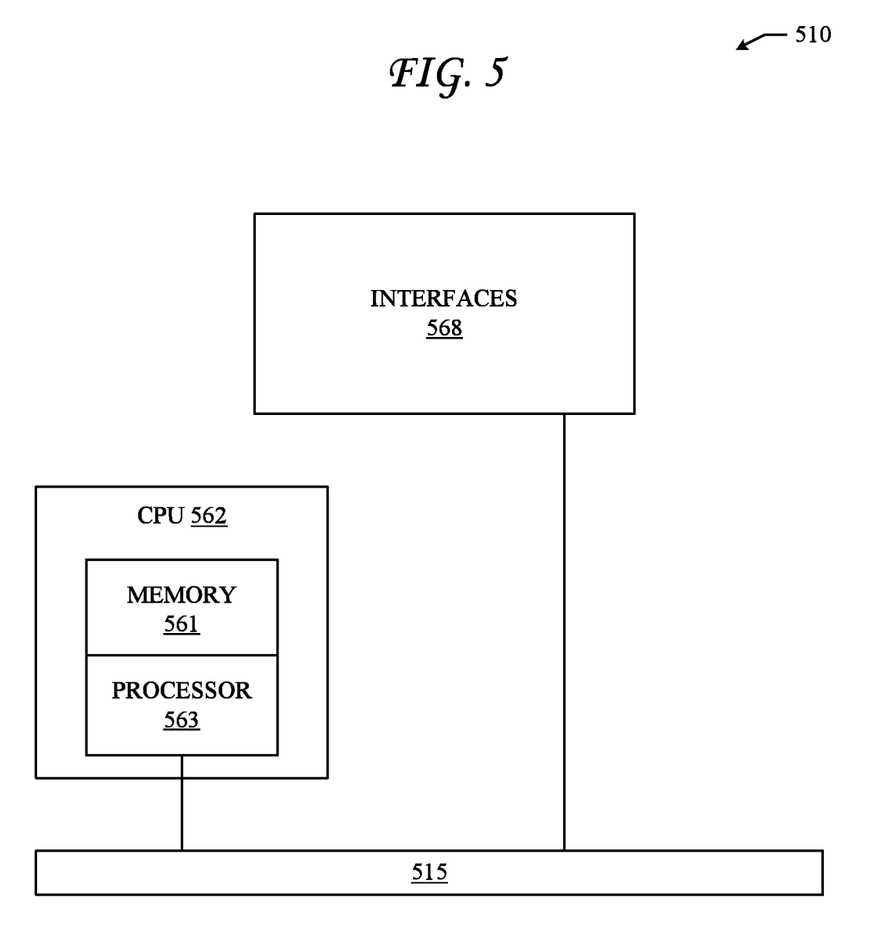
FIG. 5 illustrates an example network device.

FIG. 5 illustrates an example network device 510 suitable for high availability and failover. Network device 510 includes a master central processing unit (CPU) 562, interfaces 568, and a bus 515 (e.g., a PCI bus). When acting under the control of appropriate software or firmware, the CPU 562 is responsible for executing packet management, error detection, and/or routing functions. The CPU 562 preferably accomplishes all these functions under the control of software including an operating system and any appropriate applications software. CPU 562 may include one or more processors 563 such as a processor from the Motorola family of microprocessors or the MIPS family of microprocessors. In an alternative embodiment, processor 563 is specially designed hardware for controlling the operations of router 510. In a specific embodiment, a memory 561 (such as non-volatile RAM and/or ROM) also forms part of CPU 562. However, there are many different ways in which memory could be coupled to the system.

The interfaces 568 are typically provided as interface cards (sometimes referred to as "line cards"). Generally, they control the sending and receiving of data packets over the network and sometimes support other peripherals used with the router 510. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 562 to efficiently perform routing computations, network diagnostics, security functions, etc.

Although the system shown in FIG. 5 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 561) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 6A:
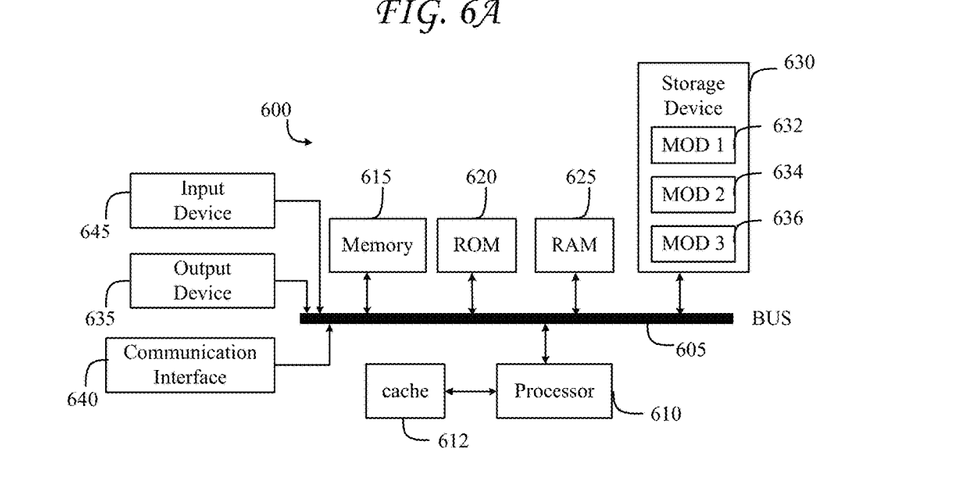
FIGS. 6A and 6B illustrate example system embodiments.
Figure 6B:
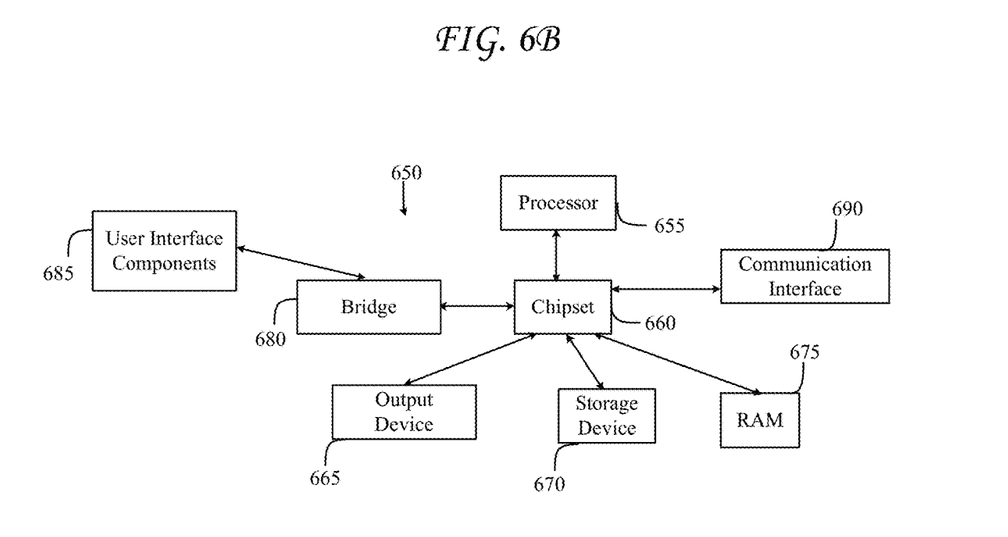

FIG. 6A and FIG. 6B illustrate example system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touchsensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates an example computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output device 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that example systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

What is claimed is:

1. A method for facilitating operations administration and management (OAM) communications across different network overlay types, the method comprising:
receiving a packet comprising an OAM payload and an overlay header, the OAM payload including an OAM TLV data field, the packet being in a format that can be read by a first transit node with a first overlay type and cannot be read by a second transit node with a second overlay type, the second overlay type being different from the first overlay type; and
encapsulating the packet with a transport header, wherein the transport header is configured to be read by both the first and second transit nodes, the transport header comprising a pointer indicating a location of the OAM TLV data field within the payload within the packet; and
receiving and reading the encapsulated packet at the second transit node;
processing, in response to the reading, the encapsulated packet based on the OAM TLV data field.

2. The method of claim 1, wherein the pointer provides an offset indicating a number of bits that a transit node should skip to read the OAM TLV data field.

3. The method of claim 1, further comprising:
encapsulating the packet with a transport encapsulation marker, wherein the transport encapsulation marker comprises an OAM marker that identifies the packet as an OAM packet.

4. The method of claim 3, wherein the OAM marker corresponds with encapsulation data corresponding with one or more of: IPv4, IPv6, segment routing with multiprotocol label switching (SR/MPLS), SRv6, and Ethernet.

5. A packet encapsulation system comprising:
at least one processor; and a memory device storing instructions that, when executed by the at least one processor, cause the system to perform operations comprising:
receiving a packet comprising an operations administration and management (OAM) payload and an overlay header, the OAM payload including an OAM TLV data field, the packet being in a format that can be read by a first transit node with a first overlay type and cannot be read by a second transit node with a second overlay type, the second overlay type being different from the first overlay type; and
encapsulating the packet with a transport header, wherein the transport header is configured to be read by both the first and second transit nodes, the transport header comprising a pointer indicating a location of the OAM TLV data field within the payload within the packet; and
receiving and reading the encapsulated packet at the second transit node;
processing, in response to the reading, the encapsulated packet based on the OAM TLV data field.

6. The system of claim 5, wherein the pointer provides an offset indicating a number of bits that a transit node should skip to read the OAM TLV data field.

7. The system of claim 5, further comprising:
encapsulating the packet with a transport encapsulation marker, wherein the transport encapsulation marker comprises an OAM marker that identifies the packet as an OAM packet.

8. The system of claim 7, wherein the OAM marker corresponds with encapsulation data corresponding with one or more of: IPv4, IPv6, segment routing with multiprotocol label switching (SR/MPLS), SRv6, and Ethernet.

9. A non-transitory computer-readable storage medium comprising instructions stored therein, which when executed by one or more processors, cause the processors to perform operations comprising:
receiving a packet comprising an OAM payload and an overlay header, the OAM payload including an OAM TLV data field, the packet being in a format that can be read by a first transit node with a first overlay type and cannot be read by a second transit node with a second overlay type, the second overlay type being different from the first overlay type; and
encapsulating the packet with a transport header, wherein the transport header is configured to be read by both the first and second transit nodes, the transport header comprising a pointer indicating a location of the OAM TLV data field within the payload within the packet; and
receiving and reading the encapsulated packet at the second transit node;
processing, in response to the reading, the encapsulated packet based on the OAM TLV data field.

10. The storage medium of claim 9, wherein the pointer provides an offset indicating a number of bits that a transit node should skip to read the OAM TLV data field.

11. The storage medium of claim 9, further comprising:
encapsulating the packet with a transport encapsulation marker, wherein the transport encapsulation marker comprises an OAM marker that identifies the packet as an OAM packet.

* * * * *